US009336555B1

(12) United States Patent
Guy

(10) Patent No.: US 9,336,555 B1
(45) Date of Patent: May 10, 2016

(54) RECORD-TIME OPTIMIZATION OF DISPLAY LISTS

(71) Applicant: Google Inc., Mountain View, CA (US)

(72) Inventor: Romain P. Guy, Millbrae, CA (US)

(73) Assignee: Google Inc., Mountain View, CA (US)

( * ) Notice: Subject to any disclaimer, the term of this patent is extended or adjusted under 35 U.S.C. 154(b) by 186 days.

(21) Appl. No.: 13/656,624

(22) Filed: Oct. 19, 2012

(51) Int. Cl.
*G06T 1/00* (2006.01)

(52) U.S. Cl.
CPC .................................... *G06T 1/00* (2013.01)

(58) Field of Classification Search
CPC .............. G06F 3/122; G06F 17/30905; G06F 17/30772; G06F 17/2241; G06F 9/3017; G06F 2212/401; G06F 9/3879; G06F 9/44; G06K 15/1849; G06K 15/1822; G06T 15/005; G06T 2210/61; G06T 15/00; G06T 19/00; G06T 1/20; H04N 9/8042
USPC .......................................................... 345/522
See application file for complete search history.

(56) References Cited

U.S. PATENT DOCUMENTS

| 4,862,392 | A | 8/1989 | Steiner |
| 5,119,477 | A | 6/1992 | Ebbers |
| 5,148,521 | A | 9/1992 | Ebbers et al. |
| 5,249,265 | A | 9/1993 | Liang |
| 5,657,479 | A | 8/1997 | Shaw et al. |
| 6,028,602 | A | 2/2000 | Weidenfeller et al. |
| 6,072,508 | A | 6/2000 | Devic |
| 6,339,427 | B1 | 1/2002 | Laksono et al. |
| 6,469,704 | B1 * | 10/2002 | Johnson .......................... 345/553 |
| 6,864,899 | B1 | 3/2005 | Barrus et al. |
| 7,330,187 | B2 * | 2/2008 | Lefebvre et al. .............. 345/522 |
| 2007/0076010 | A1 * | 4/2007 | Swamy et al. ................. 345/565 |
| 2007/0195100 | A1 * | 8/2007 | Brown et al. .................. 345/502 |
| 2012/0081376 | A1 * | 4/2012 | Sowerby et al. ............... 345/522 |
| 2012/0320100 | A1 * | 12/2012 | Machida et al. .............. 345/690 |

FOREIGN PATENT DOCUMENTS

EP 0425185 3/1997

OTHER PUBLICATIONS

Romain Guy, Android Developers Blog, Mar. 14, 2011, retrived from http://android-developers.blogspot.com/search/label/Optimization on Apr. 13, 2015.*

* cited by examiner

*Primary Examiner* — Haixia Du
(74) *Attorney, Agent, or Firm* — Fish & Richardson P.C.

(57) ABSTRACT

Methods, systems, and apparatus, including computer programs encoded on a computer storage medium, for optimizing a display list. Graphics processing commands are identified for generation of one or more graphical images on a computer device. During an initial recording of a graphics display list to include the graphics processing commands, if a sub-list of the display list is determined to not include any drawing commands, the display list is recorded so that commands on the sub-list are not executed when the display list is executed.

19 Claims, 15 Drawing Sheets

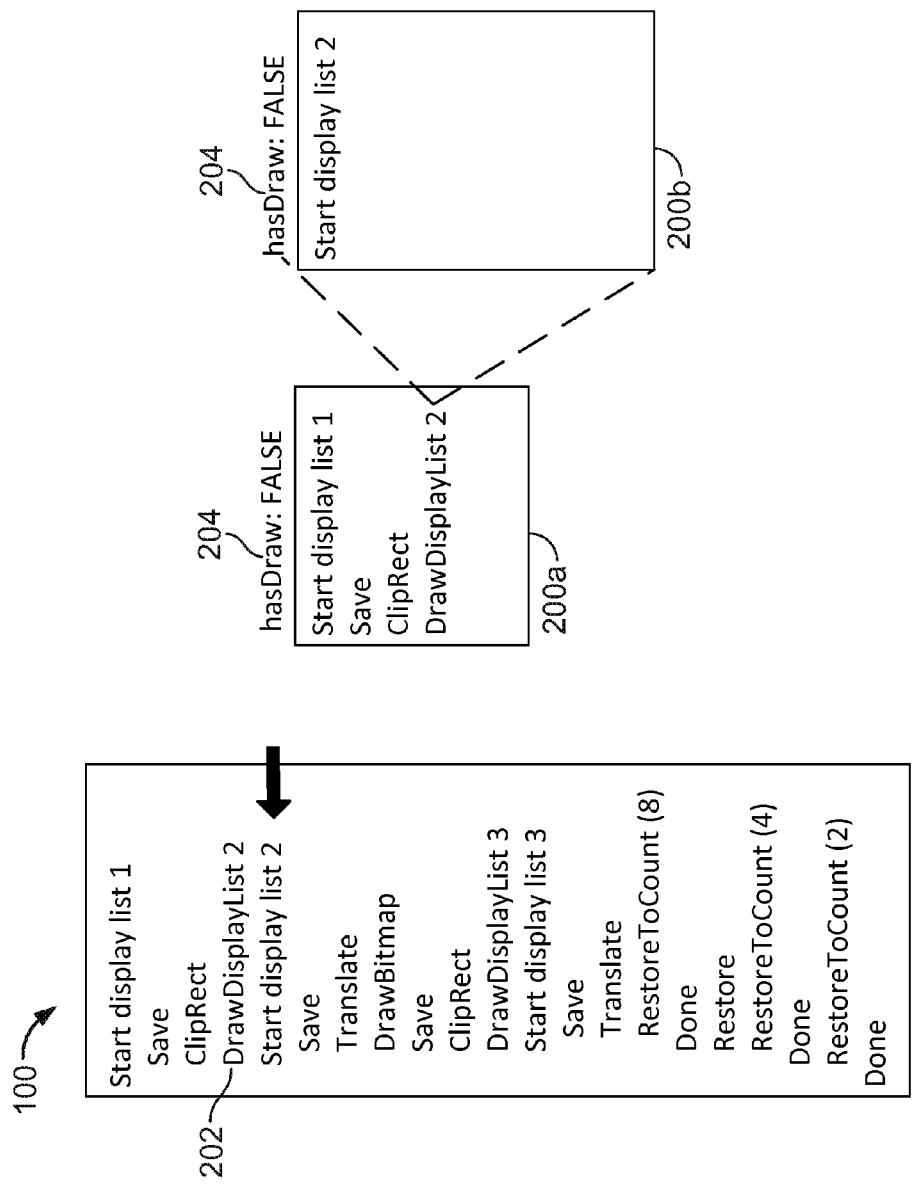

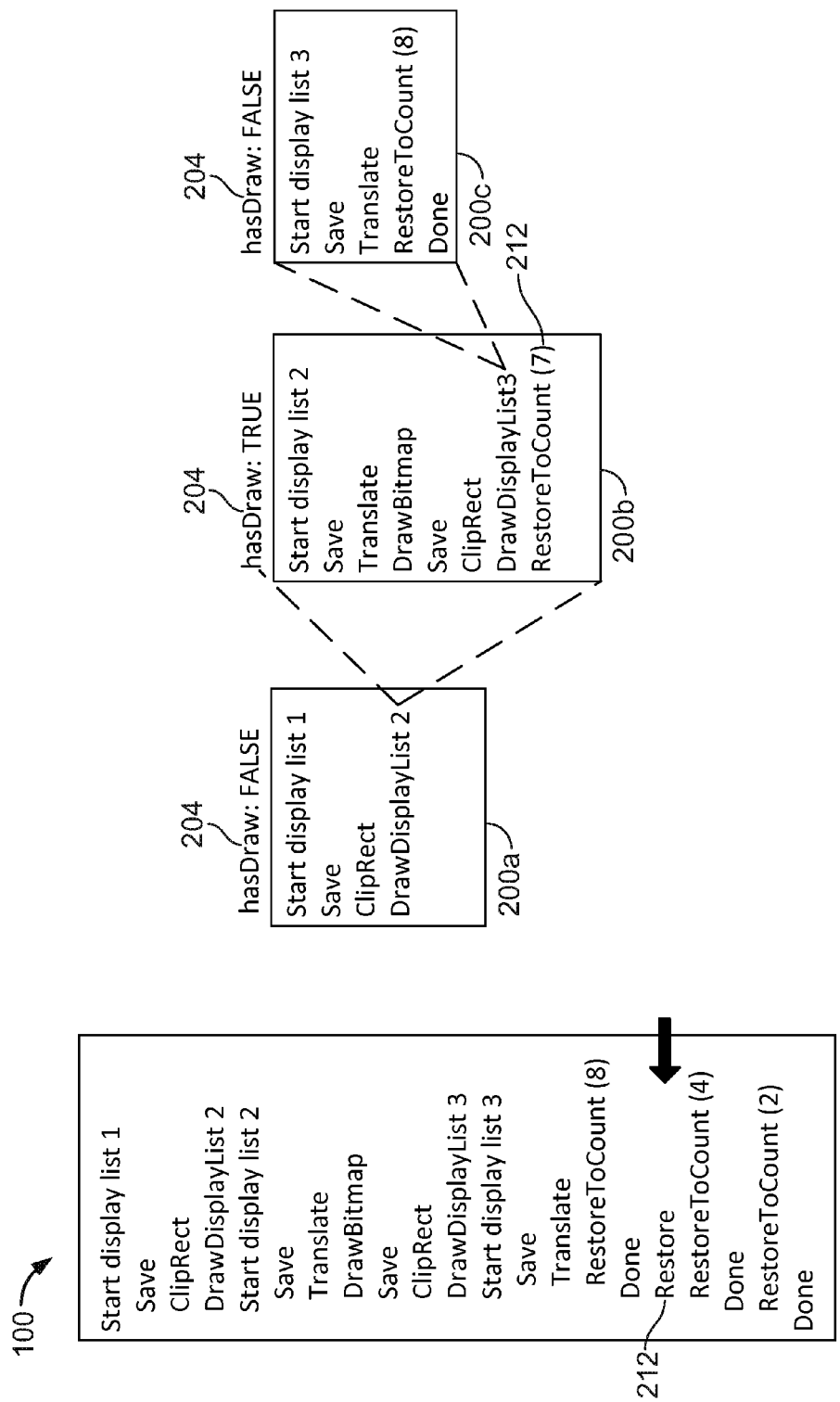

RECORD-TIME OPTIMIZATION OF DISPLAY LISTS

TECHNICAL FIELD

This document relates to components of computer operating systems, including components for graphical rendering.

BACKGROUND

Computer operating systems perform a number of functions, including serving as a bridge between computer hardware and computer applications that run on the operating systems. Modern computer operating systems also provide basic graphical user interfaces (GUIs) by which users can interact with components of the operating system in more intuitive manners.

Graphics rendering can include a variety of display commands that increase the effectiveness of processing graphical objects by allowing for processing and manipulating objects in a variety of ways within the context of a graphical display. Any particular graphical generation technique may include a number of these commands in order to process the various graphical objects in the display. Draw commands (for adding graphical objects to a display), and state commands (for manipulating existing graphical objects), may be processed in sequence in order to create the display.

Often, large portions of a display remain static between frames that are shown with the display. It may be procedurally costly and inefficient to execute the entire set of commands associated with a display when the same commands are repeated over and over again. For this reason, certain graphics systems include the ability to record a display list. The display list can extract the drawing and state commands from the logic of an application in order to create a much quicker method of repeatedly rendering the same object using a set of drawing commands.

However, a naively constructed display list may include many redundant and nonproductive drawing commands. This is a product of the fact that drawing commands within an application that are important in one situation may be unnecessary in a different situation for which the display list is recorded. It is inefficient to repeatedly execute display lists that include a large fraction of unnecessary commands.

SUMMARY

This document describes systems and techniques that may be used for managing objects within a graphical user interface for a computer operating system.

In general, one innovative aspect of the subject matter described in this specification can be embodied in methods that include the actions of identifying graphics processing commands for generation of one or more graphical images on a computer device; determining, during an initial recording of a graphics display list to include the graphics processing commands, that a sub-list of the display list does not include any drawing commands; and causing the display list to be recorded so that commands on the sub-list are not executed when the display list is executed. Other embodiments of this aspect include corresponding systems, apparatus, and computer programs, configured to perform the actions of the methods, encoded on computer storage devices.

Implementations may include one or more of the following features. Causing the display list to be recorded so that commands on the sub-list are not executed when the display list is executed may include excluding the sub-list from the display list. Causing the display list to be recorded so that commands on the sub-list are not executed when the display list is executed may include modifying a variable associated with the sub-list so that commands within the sub-list are not executed as part of executing the display list.

In general, one innovative aspect of the subject matter described in this specification can be embodied in methods that include the actions of identifying, with a computer system and as a part of an initial recording of a graphics display list, a rendering instruction that includes a state command for rendering one or more graphical objects; in response to identifying the rendering instruction, determining that, in a context of the graphics display list, proper rendering of the one or more graphical objects will occur even if the state command is not recorded to the graphics display list; and, as a result of the determining, causing the graphics display list to not include the state command. Other embodiments of this aspect include corresponding systems, apparatus, and computer programs, configured to perform the actions of the methods, encoded on computer storage devices.

Implementations may include one or more of the following features. The state command may be identified as a Restore or RestoreToCount command. The command to record to the display list immediately following the state command may also be identified as a Restore or RestoreToCount command. A single Restore or RestoreToCount command may be recorded in place of both identified commands. Each identified RestoreToCount command may have an associated Save index. For each identified state command that is a Restore command, the identified Restore command may be associated with a Save index. The single recorded command may be a RestoreToCount command with an associated Save index equal to the earlier of the Save indexes associated with the identified state commands. At least one identified state command may be a Restore command. Associating the Restore command with a Save index may include converting the Restore command to a RestoreToCount command.

The details of one or more implementations are set forth in the accompanying drawings and the description below. Other features and advantages will be apparent from the description and drawings, and from the claims.

BRIEF DESCRIPTION OF THE DRAWINGS

FIGS. 2A-2K illustrate the generation of a record-time optimized display list at various stages of recordation.

DETAILED DESCRIPTION

This document describes mechanisms by which a graphics system may operate to optimize display lists at the time of recording—that is, the list is modified to remove or ignore unnecessary commands at the time the list is generated and recorded.

Modifications that are discussed here occur at record-time, when the list is formed, rather than later at compile time (or can occur at an editing time that precedes the compile time).

By optimizing the list at record-time rather than recording the list and then later optimizing it, the graphics system may avoid expending the resources that are required to store a longer list. Record-time optimization may also be faster than compile-time optimization because many of the steps necessary to optimize the list may be redundant with steps already necessary to process and record the commands on the list.

Figure 1:
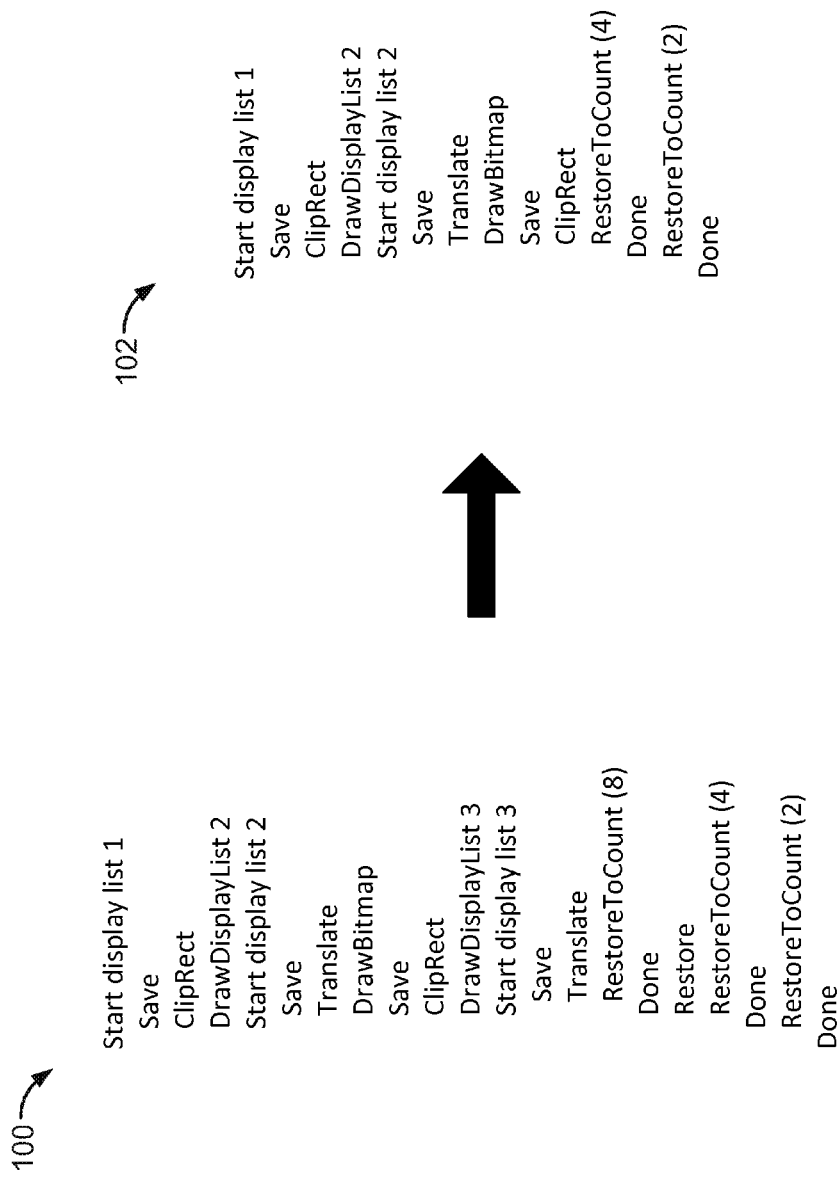
FIG. 1 shows optimized and optimized versions of a display list.

FIG. 1 demonstrates one example of a naïve list 100 that includes a number of superfluous instructions that are trimmed or otherwise modified at record-time into an optimized list 102 by processes discussed below. The naïve display list 100 represents a sequence of commands that may be executed repeatedly in order to render graphics as part of a display. It is referred to as a "naïve list" because it includes one or more superfluous commands—that is, there are commands on the display list 100 that do not change how the graphics will actually be displayed, and so can be removed from the list without affecting how the graphics will be displayed.

Because the display list might be executed repeatedly, each superfluous command may represent a significant unnecessary processing burden for a graphics system. The processes discussed below are used to trim the naïve list 100 into an optimized list 102 by removing these unnecessary commands, thus resulting in a shorter list that requires fewer system resources to execute repeatedly.

Naïve display list 100 includes a number of other display lists that are each identified in naïve display list 100 and that represent a defined set of the commands in the overall naïve display list 100. Those other displays lists are shown organized hierarchically to represent their relatively relationships to each other—where certain display lists may be considered to be children of other display lists. For example, in naïve display list 100, Display List 1 contains two other display lists, Display List 2 and Display List 3, arranged hierarchically. Some graphics systems do not permit hierarchical display lists. Other graphics systems, including the OpenGL graphics API, do allow hierarchical display lists.

The naïve list 100 shown in FIG. 1 includes thirteen state and drawing commands. The included commands are Save, ClipRect, Translate, DrawBitmap, Restore, and RestoreToCount. Twelve of the thirteen are state commands, with a single drawing command (DrawBitmap) included. State commands are commands that may indirectly affect one or more graphics objects such as by establishing their size, position, or field of presentation. Drawing commands are commands that add a graphics object to a display. Because state commands only define and manipulate existing graphics objects or the circumstances in which graphics objects will be generated, one or more draw commands are necessary for state commands to have relevance to a particular display.

Particular drawing-related commands are shown in the display lists 100 and 102 in this example. The Save command (the first command of each of the display lists in this example) creates a record of the drawing's state settings that the system can later revert to using a Restore or RestoreToCount command; Restore reverts to the last saved settings, while RestoreToCount reverts to an earlier specified call of the Save command. ClipRect restricts the display area for the object to a specified rectangle, while Translate moves the position of the focal point for displaying graphics objects using these commands. Each of these is a state command that interacts with one or more drawing commands to change the display setting for one or more graphical objects.

DrawBitmap is one example of such a drawing command, and results in a bitmap being added to the graphical objects being displayed. Other state commands and other drawings commands may also be defined in one or more of the display lists, and other display lists would typically be developed to carry out complex graphical transactions.

The optimized list 102 includes only nine of the original thirteen commands from this example. The state commands for Save, ClipRect, Translate, and RestoreToCount are still included, and DrawBitmap remains the only drawing command. In addition to removing individual commands, one embedded display list, Display List 3, is entirely removed (which may reflect a flag state as further described below), meaning none of the commands in this embedded list will be executed to cause the graphics to be displayed. The optimized list 102 differs from the naïve list 100 according to two optimization rules used when recording the display list.

First, multiple adjacent Restore commands are consolidated and recorded as one command. In order to carry this out, Restore commands are converted to RestoreToCount commands. If a second Restore or RestoreToCount command is encountered adjacent the first, only a single RestoreToCount command is stored calling the earliest Save index.

Second, the system eliminates (such as by flagging to not process) a display list that has no drawing commands. Only display lists that have at least one drawing command will be executed at all, because any display list that does not include at least one drawing command is processing state commands without any graphical object and therefore, the effects of the state commands will not be visible on the resulting display. Because the state commands of an embedded display list are superfluous without at least one drawing command in the display list, the display list does not need to be executed.

Thus, by the processing described here, fewer commands are recorded to the display list, and so fewer commands will be executed each time the display list is repeated. The graphical display represented by the display list can be represented more efficiently and with less expenditure of resources. As a result, the system records display list 102 rather than naïve display list 100. Later processing of the optimized display list 102 will be more efficient than the processing of naïve display list 100 would have been.

FIGS. 2A-2K are a series of drawings that represent steps in a process by which a displayed list like the optimized list 102 is built. In general, the series illustrates successive steps in a process by which commands are added to the optimized list. Each Figure represents one particular point in this process, which is illustrated on the left by having an arrow point to the place on the naïve list representing the most recent command processed by the system.

Although the naïve list 100 is shown for convenience representing the commands that are received and processed in order to record the optimized display list 102, the system records the display list 102 instead of the naïve display list 100, and so the naïve display list 100 might never be recorded or stored in the system. Such processing may occur by a computer processor stepping through all or some of the steps described herein with respect to the figures, in a sequential process of receiving graphical commands and recording the commands on an optimized display list.

Commands are recorded to the display list 200a (which may be an optimized list in-progress) sequentially. When the list 200a has been initialized, a hasDraw flag 204 can also be initialized and set to FALSE. The hasDraw flag 204 implements the second of the two optimization rules (discussed above) by signaling whether the display list 200a or any list embedded in the display list 200a has a drawing command. As further described below, any recorded list or sub-list with a hasDraw flag set to FALSE includes no drawing commands and therefore can be excluded when executing the display list.

Each list is initiated with its own hasDraw flag set to FALSE, which is then set to TRUE when a draw command is recorded to that list as further described below.

Figure 2A:
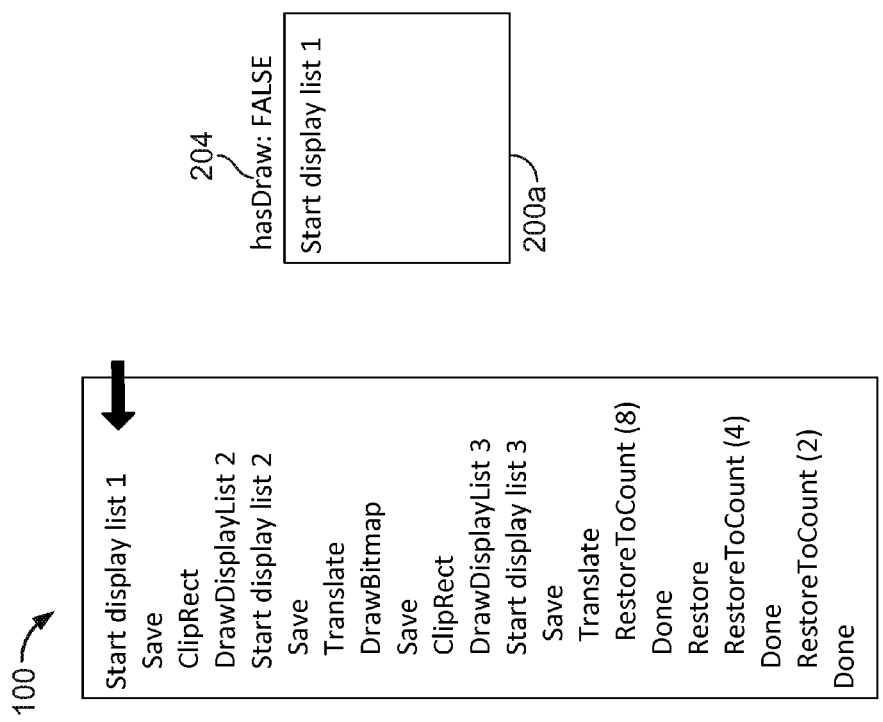
Figure 2B:
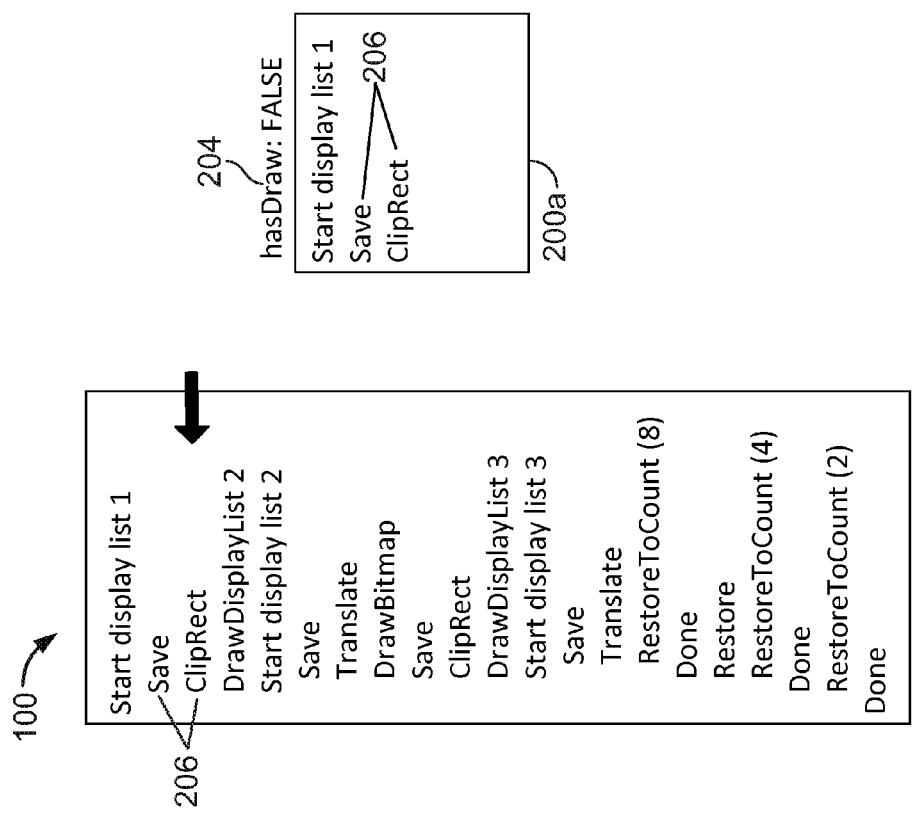

For each state command 206 that is not a Restore command, the command 206 is recorded on the list 200a. For example, as shown by FIG. 2B, the first commands processed for the display list 1 are a Save command and a ClipRect command, which are both state commands 206. Each of these commands 206 is therefore added to the display list 200a. The position of the arrow in FIG. 2B designates that each of the commands up to and including the ClipRect command 206 have been processed, and the results of those processing steps are shown in the recorded commands 206 shown on the display list 200a.

FIG. 2C shows that a DrawDisplayList instruction 202 starts a hasDraw flag 204 for a new list 200b, which is again set to FALSE at the initiation of the new list as described above. Display list 2 is an embedded display list 200b (and is inbedded in display list 1 as indicated by the hierarchical arrangement). In executing the DrawDisplayList instruction 202, further commands will be processed within the embedded display list 200b until the system encounters a Done command, which signals the end of this sub-list.

Figure 2D:
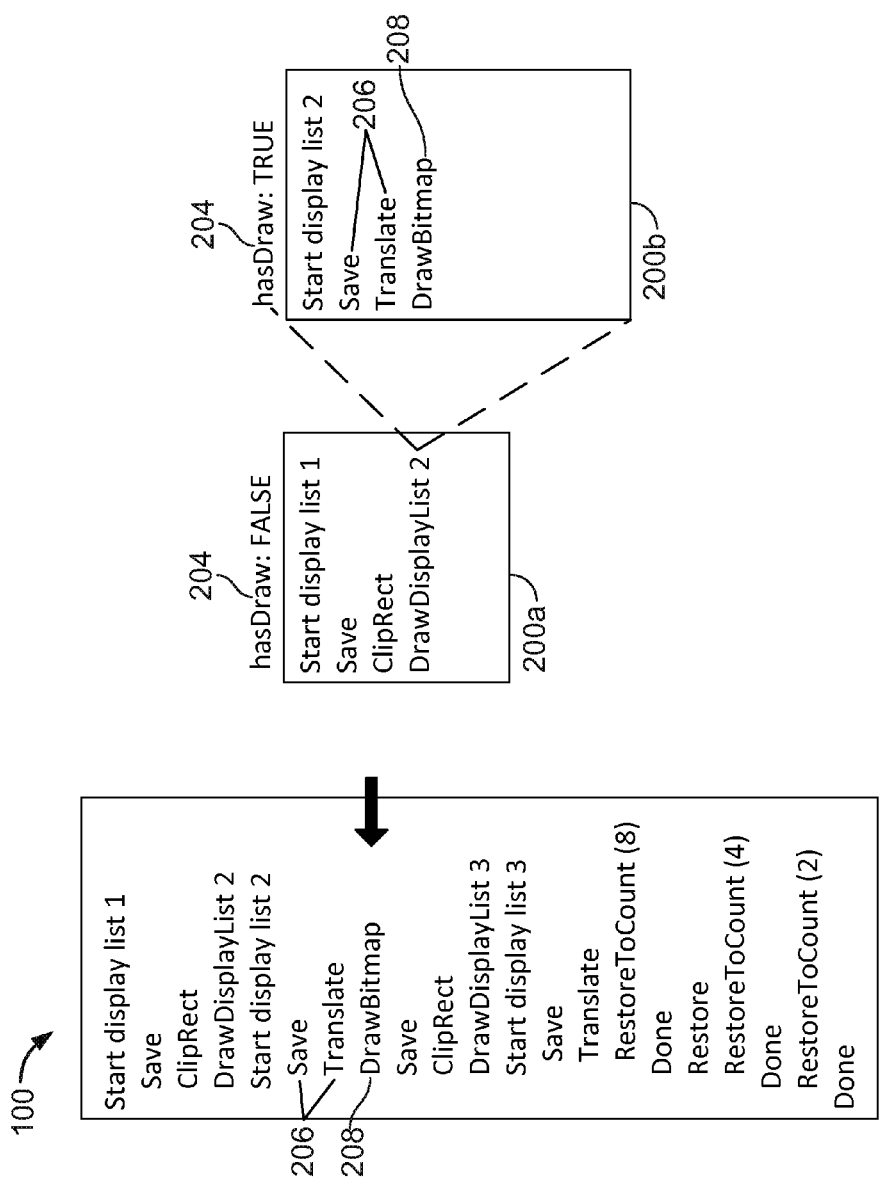

As shown in FIG. 2D, the first two commands to be processed after beginning the sub-list 200b are state commands 206, Save and Translate, which are recorded to this new list 200b in the order they are processed. The system next encounters a drawing command 208, in this case DrawBitmap. In addition to recording the drawing command 208 on the sub-list 200b, the system also sets the flag 204 on the active list 200b to TRUE, as shown in FIG. 2D. This is because the sub-list 200b now includes a drawing command 208, which is the property of the sub-list 200b for which the hasDraw flag 204 is there to track.

Figure 2E:
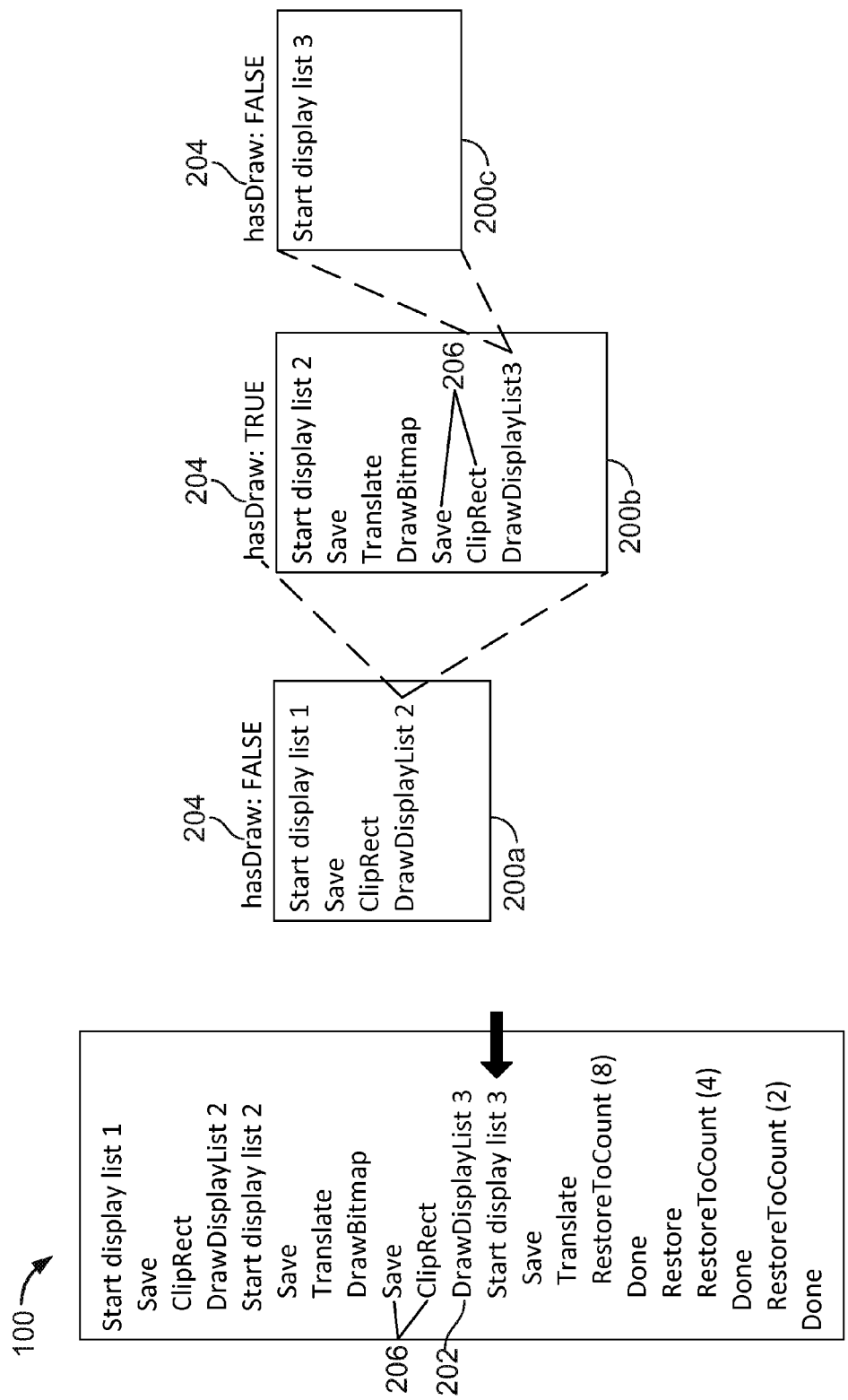
Figure 2F:
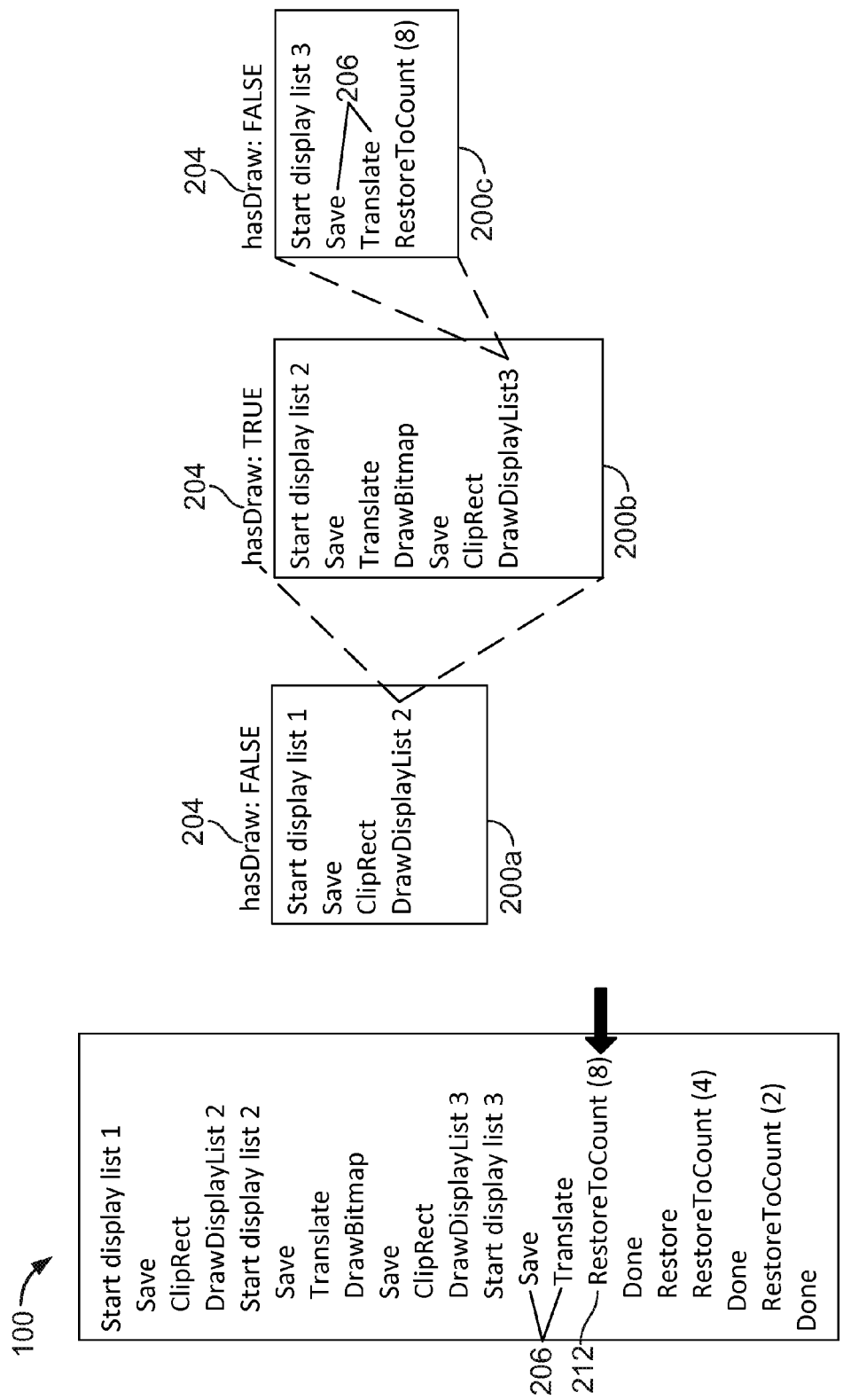

As shown in FIG. 2E, the further state commands 206, Save and ClipRect, are again stored to the sub-list 200b in the order they are processed. Next, the system processes another DrawDisplayList instruction 202 and initializes a further sub-list 200c that is embedded in the sub-list 200b. The sublist 200b is initialized with a hasDraw flag 204 set to FALSE, as described above, in order to track whether a drawing command has yet been added to the sub-list 200c.

As the system continues to process commands in order to generate the optimized display list, it next encounters two state commands 206, Save and Translate, which are recorded in the active list 200c in the order they are processed. The system next encounters a RestoreToCount command, which is recorded on the list 200c after the process determines that the following instruction is not also a Restore or RestoreToCount command, as described below with respect to FIGS. 2H-2I.

The Done instruction 210 signals the end of the current list. The system responds to the Done instruction by closing the active list 200c and continuing the recording of the display list at the next available list 200b in the hierarchical arrangement created by the embedded lists 200a-c.

Figure 2G:
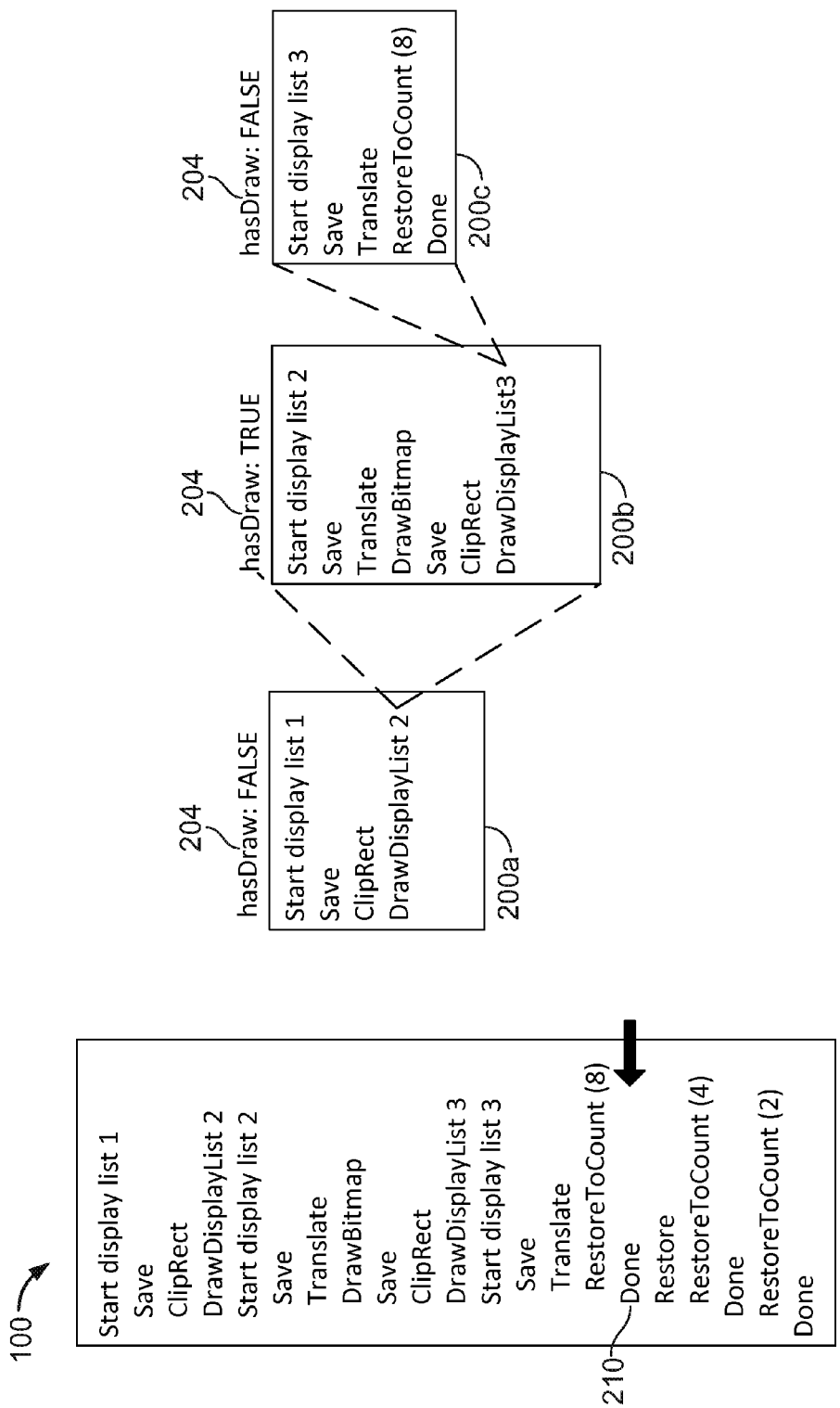

Once a Done instruction 210 is encountered, no further commands are added to the sub-list, and therefore the state of the hasDraw flag 204 associated with that list is set and will not change again. If a drawing command has already been encountered, then the hasDraw flag 204 will have been set to TRUE as described; otherwise, the hasDraw flag 204 will have remained set to FALSE because no drawing command exists on the list or any sub-list embedded in the list. As shown in FIG. 2G, the hasDraw flag 204 associated with Display List 3, represented by the list 200c, is set to FALSE, which means that Display List 3 will have that setting permanently.

The hasDraw flag being set to FALSE after a display list has been fully constructed is the signal to eliminate the display list as having no draw commands—one of the two rules for reducing and optimizing the display list. Such eliminating may be carried out in a variety of ways.

In some implementations, the arrival of a Done instruction for a list that has a FALSE flag may result in marking the list so that the list is bypassed during execution, such as by creating a runtime variable or flag associated with the list that indicates not to execute the list. In some embodiments, the hasDraw flags may be recorded and included as part of the display list, and the FALSE hasDraw flag can serve as the markindicating that the list can be bypassed.

In some implementations, particularly in implementations in which post-processing optimization occurs in addition to the record-time optimization described here, the unneeded display list (or lists) may be removed entirely from the optimized display list record. For example, in the illustration of FIG. 1, the optimized Display List omits Display List 3, which can be considered an example of this latter approach.

As shown in FIG. 2H, the system next processes a Restore state command 212. In accordance with one of the rules for list optimization, the Restore command 212 (which may either be Restore or RestoreToCount) may be treated differently than other state commands are treated. Specifically, upon receiving a Restore command, the system also determines what command or instruction directly follows it. If another Restore command (which, again, may be either of Restore or RestoreToCount) follows the first Restore command, then the two commands will be consolidated.

Figure 2I:
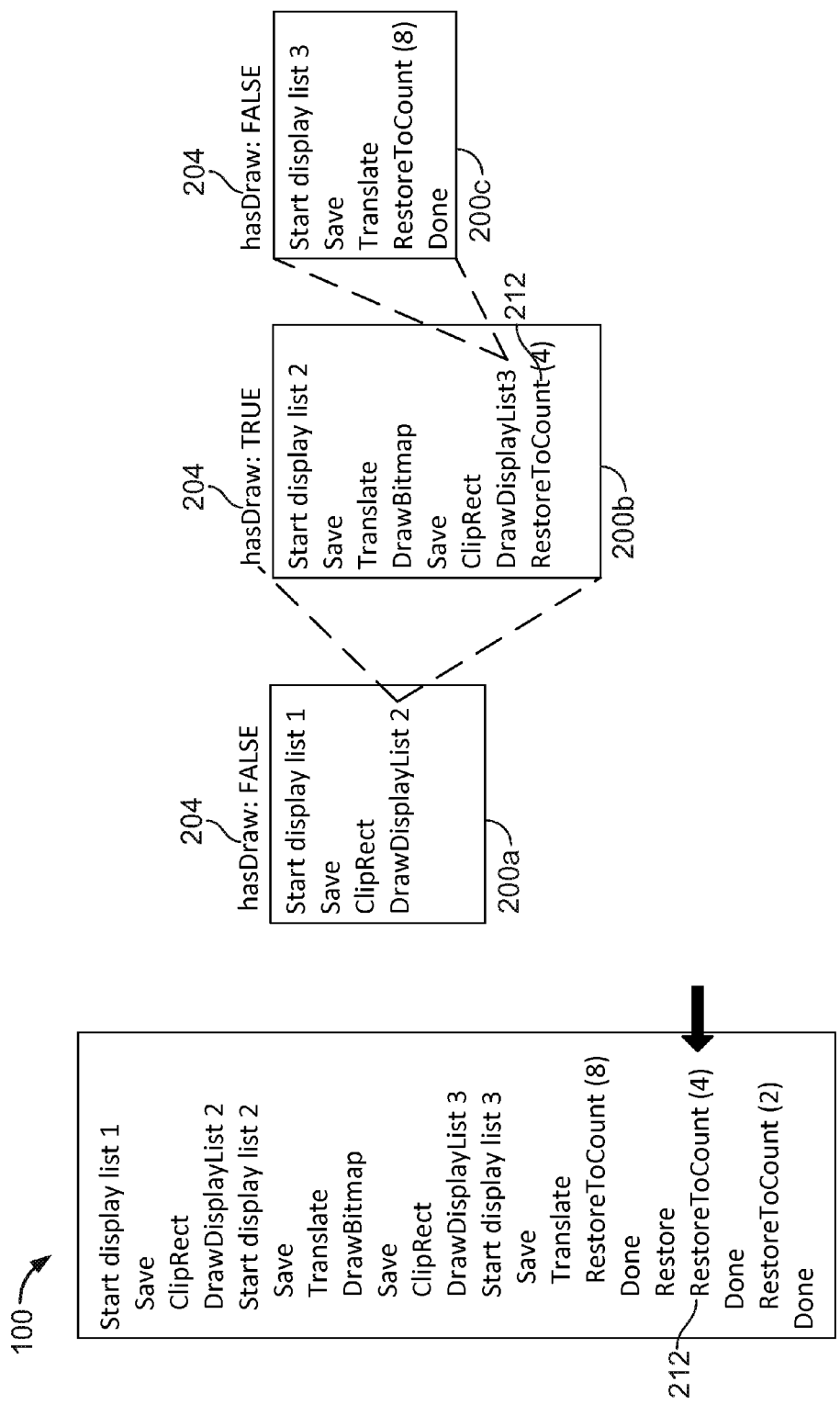

The system may check for a second Restore command in a number of ways. For example, as represented by FIGS. 2H and 2I, receiving a Restore command 212 may result in the command being written to the list 200b but only provisionally—that is, the command 212 is the last item on the list and may still be removed depending on what command or instruction follows it. Alternatively, where sufficient memory exists to buffer a Restore command 212, the command 212 may be kept in memory and not written to the list until the following command or instruction is checked.

As explained above, a Restore command functions the same as a RestoreToCount command, using the current save index. Therefore, if the command 212 is a Restore command rather than a RestoreToCount command, the system may replace the Restore command with a RestoreToCount command using the current save index. In the example shown in FIG. 2H, the current save index is 7. Therefore, as shown, the received Restore command is recorded on the display list 200b as a RestoreToCount command with save index 7 as its argument.

Figure 2J:
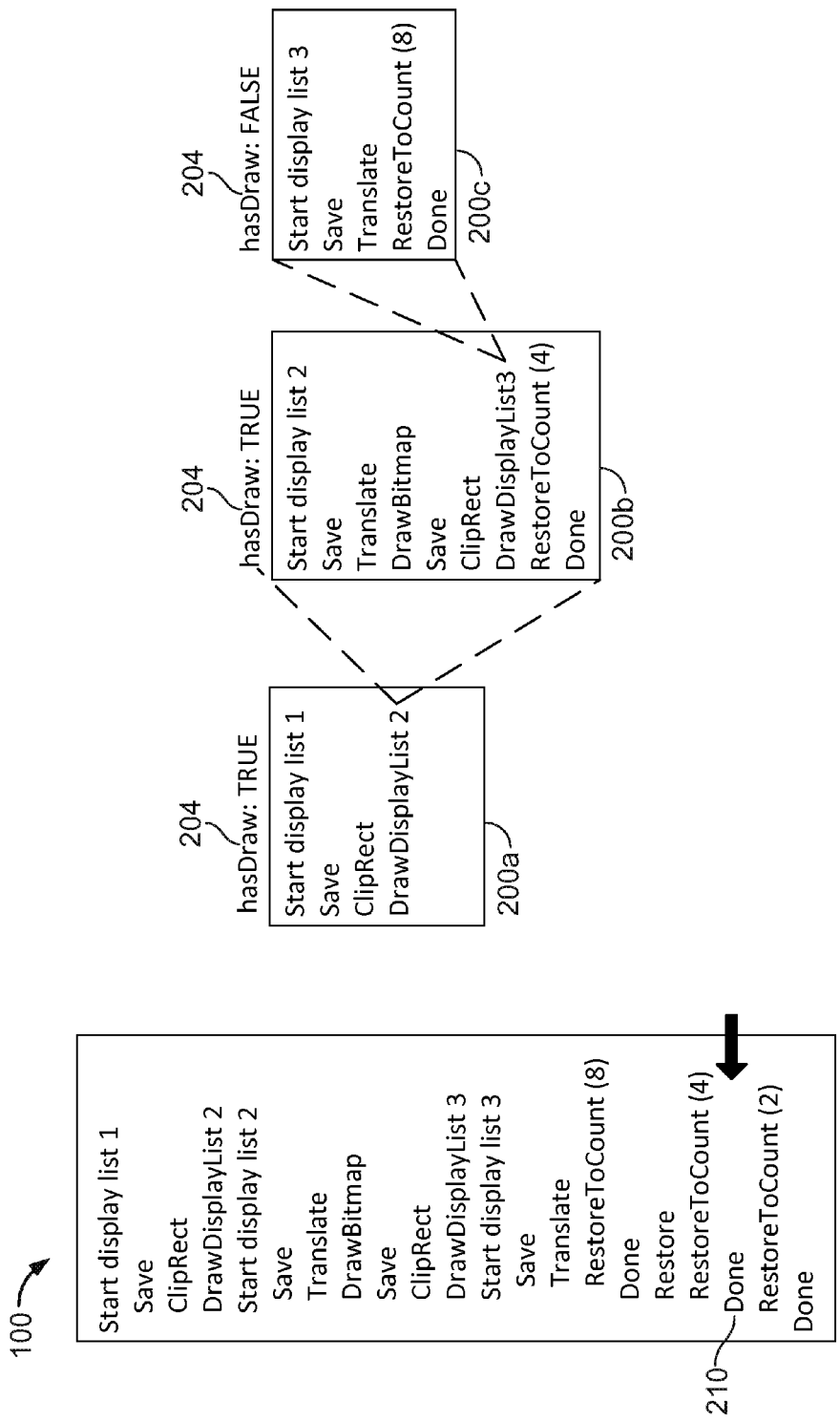

As shown in FIG. 2I, when the next command is also shown to be a Restore command 212, the two Restore commands 212 are consolidated as a single command 212. The earliest save index of the RestoreToCount commands (which, in some implementations, will be the smallest index) may be the one that is recorded. In the example shown in FIG. 2I, the RestoreToCount command with save index 7 as an argument and a RestoreToCount command with save index 4 as an argument are consolidated into a RestoreToCount command with save index 4. FIG. 2J shows the processing of the Done instruction 210 for the second display list 200b. In this case, the hasDraw tag for Display List 2 is set to TRUE, which means that the sub-list 200b has at least one drawing command and should be executed as part of the optimized display list.

Additionally, because the sub-list 200b has a TRUE hasDraw tag 204, when emerging from that sub-list 200b, the system sets the hasDraw tag 204 list 200a to TRUE. In this way, a list which includes an embedded sub-list with a drawing command will also be treated as having a drawing command. This avoids mistakenly bypassing a drawing command in an embedded list.

Although the example shown in FIG. 2J sets the hasDraw flag for the initial display list 200a only when the embedded sub-list 200b is completed, in some embodiments, each display list that is hierarchically above a sub-list may have its flag set to TRUE at the same time that the sub-list containing the drawing command is so updated. For example, the hasDraw flag 204 associated with the initial list 200a could have been set to TRUE at the point in the process represented by FIG. 2D.

Figure 2K:
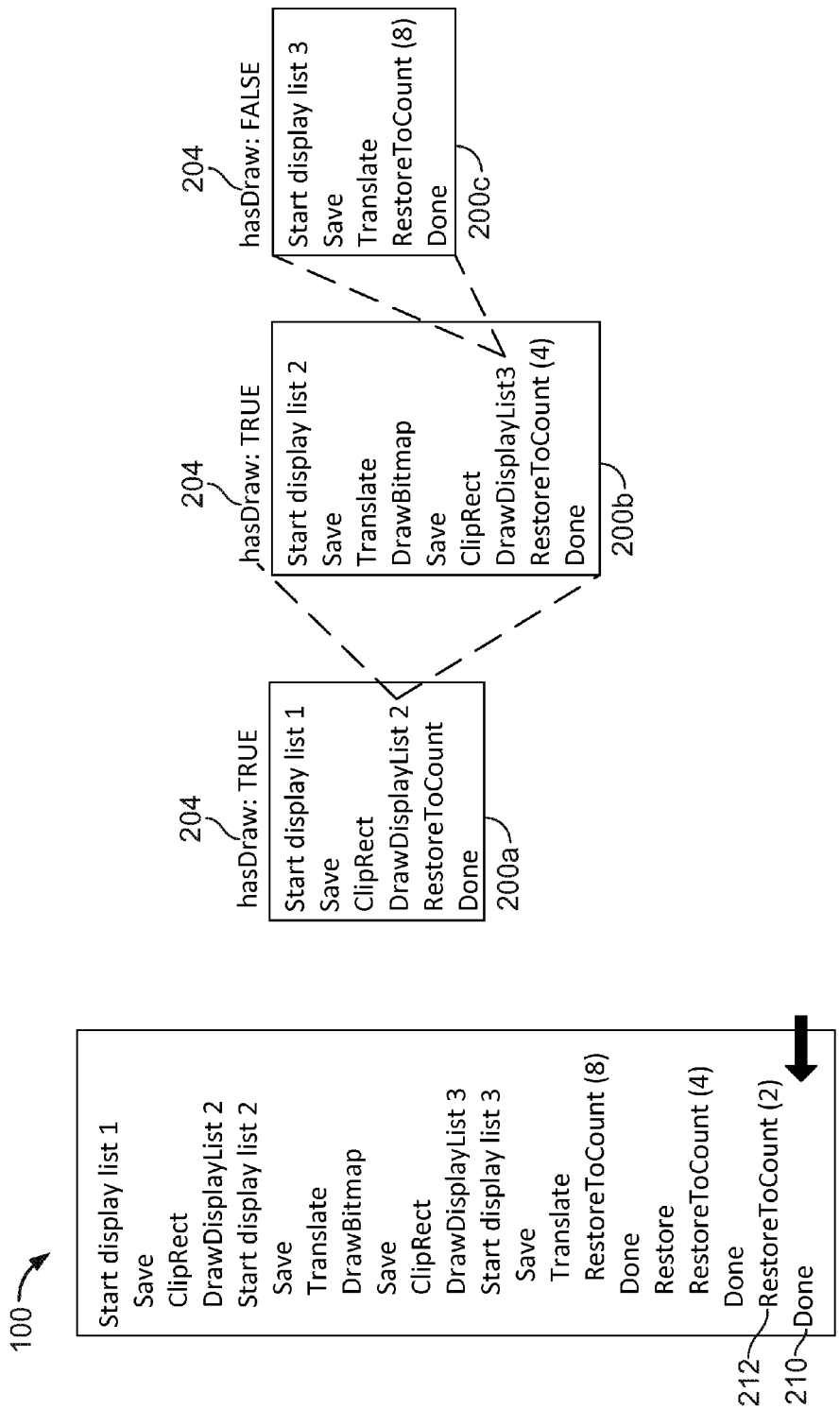

As shown in FIG. 2K, Another RestoreToCount command 212 is processed next. The system determines that the command or instruction that follows the RestoreToCount command 212 is not another Restore command and adds the command 212 to the list 200a. Finally, the system encounters a Done instruction 210 for the initial list 200a, which completes the recording of the optimized display list.

By the described and pictured process, then, an optimized display list may be recorded whose need for subsequent processing is less expensive in terms of processing resources than a naïve display list recorded from the same received commands.

Figure 3:
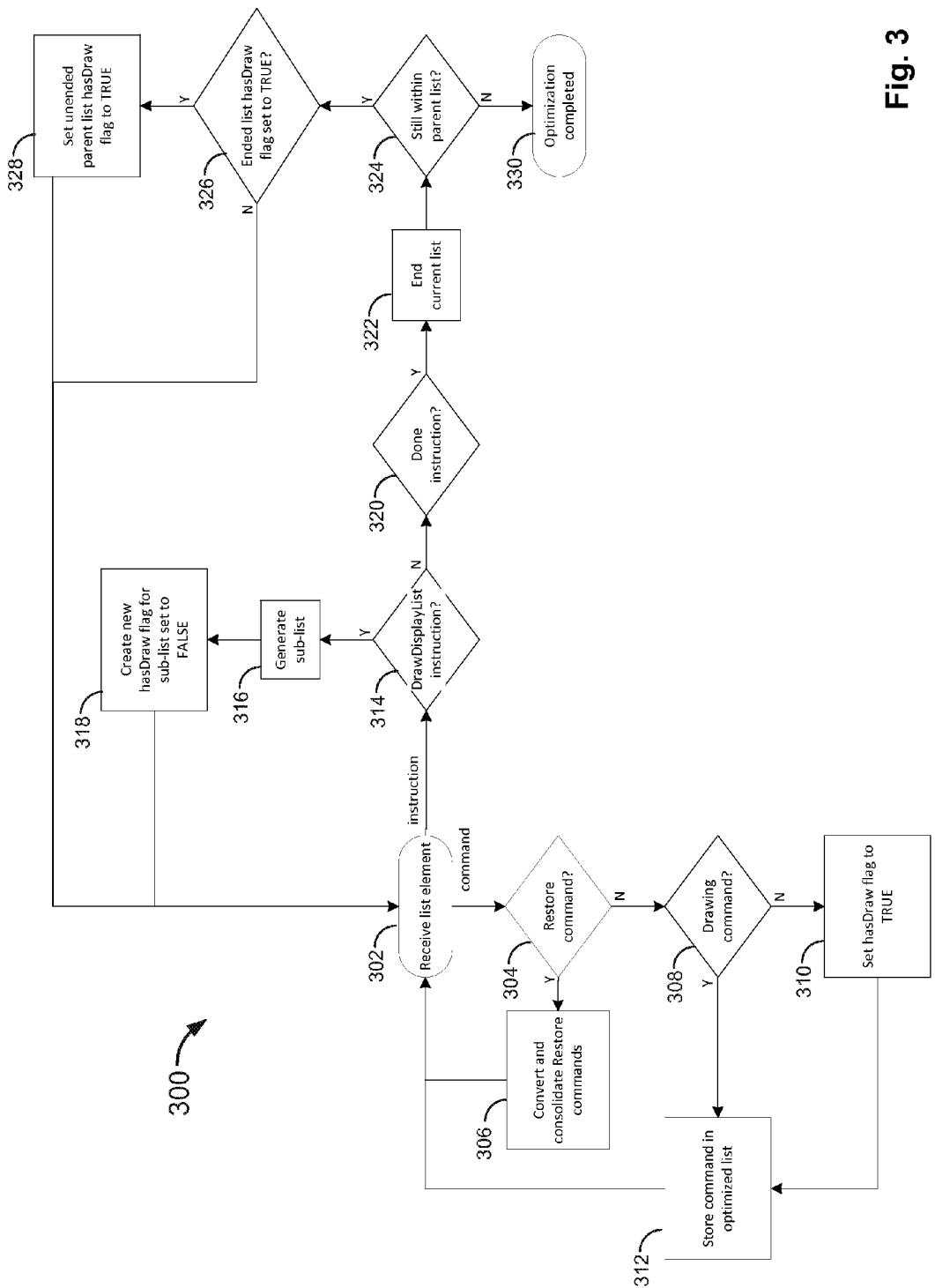
FIG. 3 is a flowchart of an example process for generating an optimized display list.

FIG. 3 is a flowchart illustrating a process 300 by which a display list can be optimized, using optimization rules like those explained earlier. The system recording the display list receives and deals with each list element in turn, according to which element is received. The instruction branch of the flowchart is used to describe how the system deals with the initialization and completion of embedded sub-lists, and takes into account the special case of completing a sub-list with a TRUE hasDraw flag as described above. The command branch of the flowchart described how the system deals with commands, and takes into account the special cases of drawing commands and Restore commands as described above.

Referring now to particular elements in the flow chart, the system receives a list element for processing and recording (302). The list element is either a command element that represents a drawing command or a list instruction element. If the element is a command element ("command" branch of block 302), then the system checks to see if the command is a Restore command (304).

If the list element is determined to be a Restore command ("Y" branch of block 304), then the system may convert any Restore commands to RestoreToCount commands if necessary, and then consolidate the Restore command with other Restore commands at a position that immediately follows or precedes the Restore command on the list (306). Such consolidation may involve determining if the last-added member of the current display list is also a Restore command or accessing the next list element to be processed to determine whether it is a Restore command. At the end of the consolidation step 306, two or more Restore commands are not adjacent on the optimized display list in this example. Instead, only one Restore command (which may, in some implementations, be a RestoreToCount command, as Restore commands may be converted to RestoreToCount commands as part of step 306) is located at the bottom of the optimized display list. Following conversion and consolidation (306), the next list element is received (302).

If instead, the command was not a Restore command (the "no" branch of decision block 304), then the system checks to determine whether the command is a drawing command (308). If the system identifies the command as being a drawing command, the system sets the hasDraw flag on the active display list or sub-list to TRUE (310). The command, whether a drawing command or not, is then recorded on the in-process optimized display list (312). The system then receives the next list element for processing (302).

List instructions ("instructions" branch of block 302) in this example include DrawDisplayList instructions, which begin a new sub-list within the present list, and Done instructions, which end the current list. For a DrawDisplayList instruction (314), a new sub-list is initialized and made the active display list (316). A new hasDraw flag is created for the sub-list, and initially set to FALSE (318) before the next list element is retrieved (302).

A Done instruction (320) completes the active display list, which may be a sub-list (322). Upon receiving a Done instruction, the system may identify the active display list as being either a sub-list within a parent list ("yes" branch of decision block 324) or as the initial list. ("no" branch of decision block 324).

If a parent list exists for the current display list that has just been ended, then the system checks the hasDraw flag of the completed sub-list to determine whether the hasDraw flag is set to TRUE, indicating that at least one drawing command is listed within that sub-list or a further sub-list embedded within that sub-list (326). If the hasDraw flag is set to TRUE, then the parent list's hasDraw flag is also set to TRUE (328). In either case, the next list element is then received in order to continue optimizing the remainder of the parent list (302).

If instead the system determines that the active display list has no parent list ("no" branch of decision block 324), then the system has received the Done instruction for the initial list, completing the optimization process (330). Further post-processing may be completed on the recorded display list. In some embodiments, an optimized display list may be stored in a computing system for later use, or may be referenced immediately as part of an ongoing graphics rendering process.

Ideally the optimization should end at this step 330. It will be recognized, however, that further complication, such as thrown exceptions, processing errors, and flaws in the display list may result in other outcomes. Also, although particular processing steps for a particular example display list are shown here, similar operations may be performed on display lists that have other commands, or additional instances of the same commands discussed here, or different ordering of the commands. The particular translation that would occur in recording an optimized display list for any such example display lists would follow the basic approaches described here.

Figure 4:
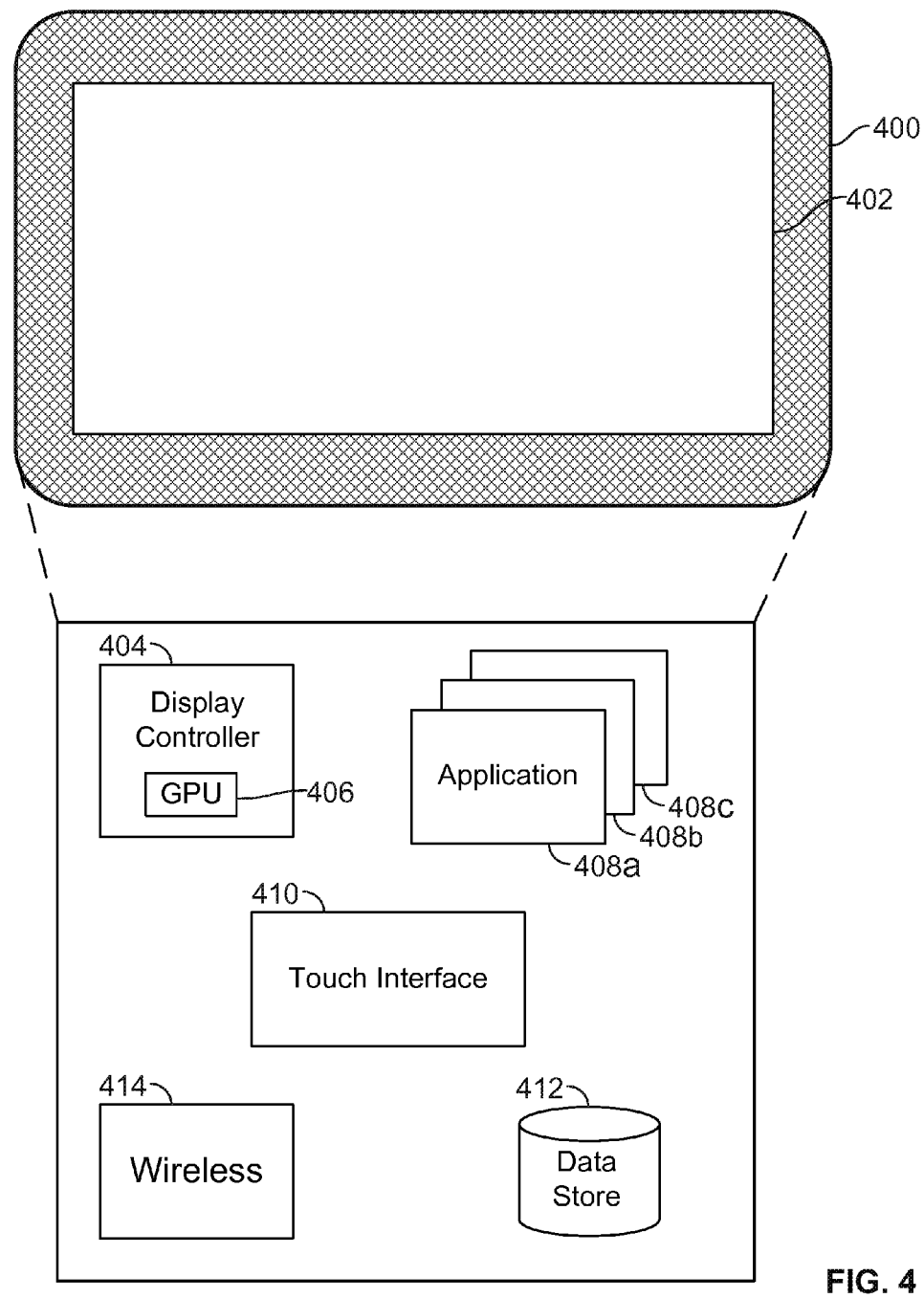
FIG. 4 shows aspects of an example device for displaying content, which may be used with the techniques described here.

FIG. 4 shows an example mobile device 400 for displaying content on a graphical user interface. The mobile device is shown here in the form of a tablet computer having a touchscreen 402 user interface of a familiar type.

The device 400 includes a number of components to assist in executing software in a manner that is pleasing and useful to a user. Certain example components are shown here. For example, a display controller 404 may be programmed to coordinate the display of various items on the touchscreen 402. For example, the display controller 404 may receive graphical input from a number of different applications 408a, 408b, 408c and from an operating system, and may determine the manner in which such items should be displayed. Each application 408a, 408b, 408c may be responsible for rendering one or more graphical objects for display, and may provide drawing commands to the display controller 404, which may in turn generate one or more display lists in order to reduce redundant rendering of the provided commands. The display controller 404 may identify and optimize multiple display lists in accordance with the methods described. The display controller 404 may include a GPU or graphical processing unit 406 and any other components necessary to manage the display of the mobile device 400.

A touch interface 410 may take a familiar form and may interpret input by a user on a touchscreen. The touch interface 410 may coordinate with the display controller 404 to identify what item or items on a display a user is selecting by touching at a particular location.

A data store 412 may store information about various entities needed to provide the functionality described here. For example, graphic object data and rendering instructions may be stored in a data store 412, as well as optimized display lists for graphical objects generated with the above-described techniques. A wireless module 414 allows the device 400 to communicate wirelessly with other electronic computing devices (not shown).

Figure 5:
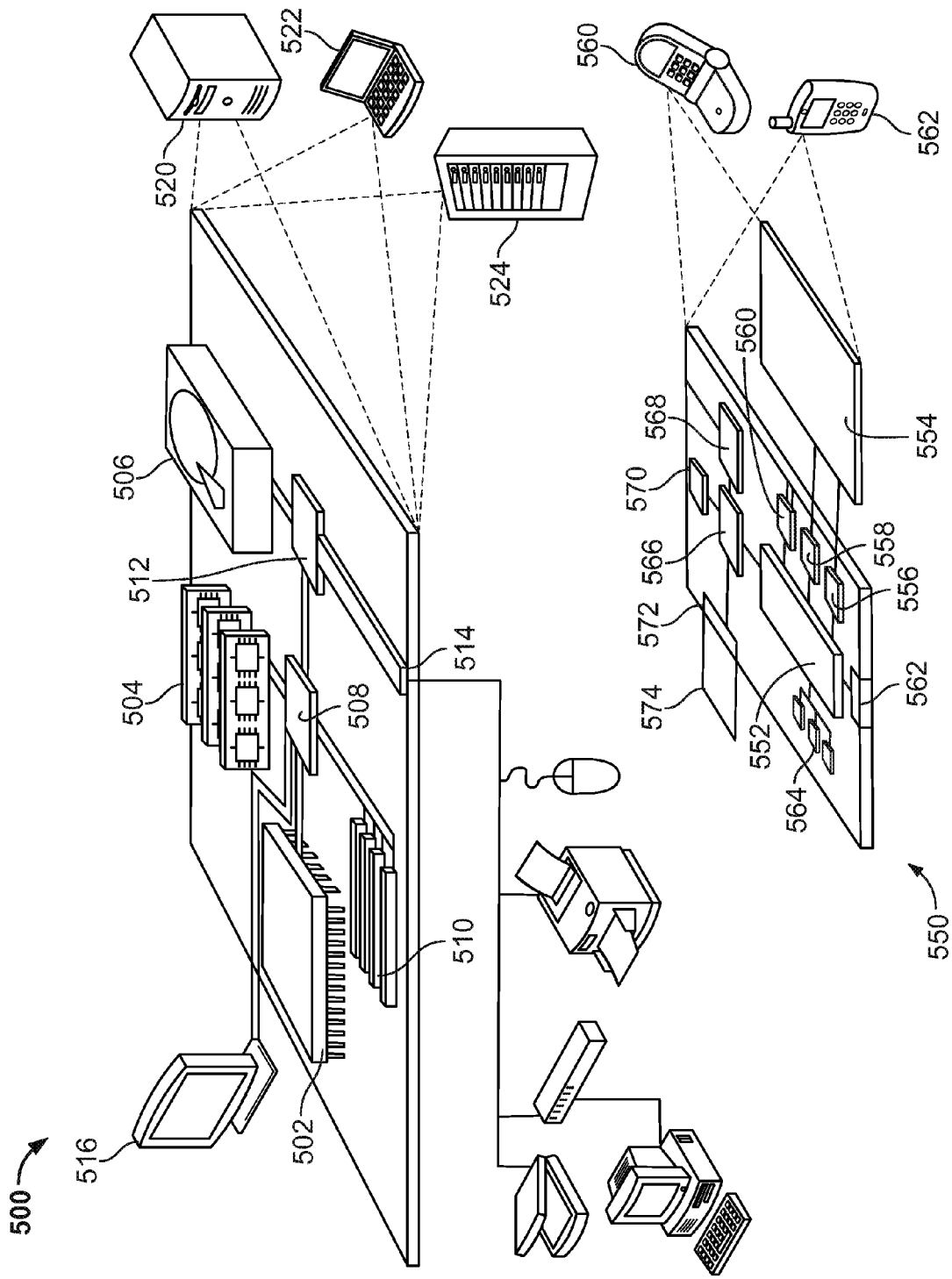
FIG. 5 shows an example of a generic computer device and a generic mobile computer device, which may be used with the techniques described here.

FIG. 5 shows an example of a generic computer device 500 and a generic mobile computer device 550, which may be used with the techniques described here.

Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, tablet computers and other similar computing devices. The components shown here, their connections and relationships, and their functions, are meant to be exemplary only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving, by one or more computers, graphics processing commands for generation of one or more graphical images on a computer device;
   as each graphics processing command is received, during a record time when a graphics display list is initially generated, and before any compiling of the graphics display list occurs:

determining whether each graphics processing command is not a drawing command, and initially recording the graphics display list, by the one or more computers, for later execution so that a sub-list of particular commands that are determined to not be drawing commands are not executed when the display list is executed, by the particular commands being indicated as non-executing or being discarded; and executing the display list for generation of the one or more graphical images.

2. The computer-implemented method of claim 1, wherein initially recording the graphics display list for later execution so that commands on the sub-list are not executed when the display list is executed comprises excluding the sub-list from the display list.

3. The computer-implemented method of claim 1, wherein initially recording the graphics display list so that commands on the sub-list are not executed when the display list is executed comprises modifying a variable associated with the sub-list so that commands within the sub-list are not executed as part of executing the display list.

4. The computer-implemented method of claim 1, wherein:

the graphics processing commands are arranged in a multi-level hierarchy of commands; and initially recording the graphics display list comprises causing an entire level of the multi-level hierarchy to be excluded from execution when the display list is executed based on determining that all commands in the entire level are not drawing commands.

5. The computer-implemented method of claim 1, further comprising, while determining which of the graphics processing commands are not drawing commands, maintaining a flag that indicates whether any graphics processing command among a sub-group of a plurality of graphics processing commands is a drawing command.

6. The computer-implemented method of claim 5, wherein:

the graphics processing commands are arranged in a multi-level hierarchy of commands; and the flag indicates whether any commands in a particular level of the hierarchy are drawing commands.

7. The computer-implemented method of claim 6, further comprising discarding all commands in the particular level of the hierarchy upon analyzing all the commands in the particular level of the hierarchy and determining that none of the commands in the particular level of the hierarchy is a drawing command.

8. The computer-implemented method of claim 7, further comprising setting a flag for a higher level of the hierarchy to indicate whether the particular level includes any drawing commands based on a setting of a flag for a sub-level of the hierarchy contained in the higher level.

9. The computer-implemented method of claim 1, further comprising consolidating multiple commands of the graphics processing commands into a single graphics processing command.

10. The computer-implemented method of claim 9, wherein consolidating the multiple commands of the graphics processing commands into the single graphics processing command comprises consolidating multiple Restore commands into a single RestoreToCount command.

11. A system comprising:

one or more computers and one or more storage devices storing instructions that are operable, when executed by the one or more computers, to cause the one or more computers to perform operations comprising:

receiving, by one or more computers, a sequence of graphics processing commands for generation of one or more graphical images on a computer device;

as each graphics processing command is received, during a record time when a graphics display list is initially generated, and before any compiling of the graphics display list occurs:

determining whether each graphics processing command is not a drawing command, and initially recording the graphics display list, by the one or more computers, for later execution so that a sub-list of particular commands that are determined to not be drawing commands are not executed when the display list is executed, by the particular commands being indicated as non-executing or being discarded; and executing the display list for generation of the one or more graphical images.

12. The system of claim 11, wherein initially recording the graphics display list for later execution so that commands on the sub-list are not executed when the display list is executed comprises excluding the sub-list from the display list.

13. The system of claim 11, wherein initially recording the graphics display list so that commands on the sub-list are not executed when the display list is executed comprises modifying a variable associated with the sub-list so that commands within the sub-list are not executed as part of executing the display list.

14. A non-transitory computer-readable medium storing software comprising instructions executable by one or more computers which, upon such execution, cause the one or more computers to perform operations comprising:

receiving, by one or more computers, a sequence of graphics processing commands for generation of one or more graphical images on a computer device;

as each graphics processing command is received, during a record time when a graphics display list is initially generated, and before any compiling of the graphics display list occurs:

determining whether each graphics processing command is not a drawing command, and initially recording the graphics display list, by the one or more computers, for later execution so that a sub-list of particular commands that are determined to not be drawing commands are not executed when the display list is executed, by the particular commands being indicated as non-executing or being discarded; and executing the display list for generation of the one or more graphical images.

15. The medium of claim 14, wherein initially recording the graphics display list for later execution so that commands on the sub-list are not executed when the display list is executed comprises excluding the sub-list from the display list.

16. The medium of claim 14, wherein initially recording the graphics display list so that commands on the sub-list are not executed when the display list is executed comprises modifying a variable associated with the sub-list so that commands within the sub-list are not executed as part of executing the display list.

17. A computer-implemented method comprising:

receiving, by one or more computers, graphics processing commands for generation of one or more graphical images on a computer device;

as each graphics processing command is received, during a record time when a graphics display list is initially generated, and before any compiling of the graphics display list occurs:

determining whether each of the graphics processing commands is a drawing command, and initially recording, on the graphics display list and by the one or more computers, (i) only the graphics processing commands that are determined to be drawing commands, or (ii) the graphics processing commands that are determined to be drawing commands and the graphics processing commands that are determined not to be drawing commands and, for each graphics processing command that is determined not to be a drawing command, an indication that the graphics processing command is non-executing or discarded; and executing the display list for generation of the one or more graphical images.

18. The computer-implemented method of claim 17, wherein the one or more computers does not record another graphics display list that includes the graphics processing commands that are determined not to be drawing commands.

19. The computer-implemented method of claim 17, wherein the one or more computers does not record another graphics display list that includes each graphics processing command that is determined not to be a drawing command with the indication that the graphics processing command is non-executing or discarded.

* * * * *